United States Patent Office 3,787,595
Patented Jan. 22, 1974

3,787,595
PROCESSING OF BEANS AND PEAS BY FREEZE DRYING
Robert G. Folzenlogen, Green Township, Hamilton County, and James P. Smith, North College Hill, Ohio, assignors to The Procter & Gamble Company, Cincinnati, Ohio
No Drawing. Filed Nov. 17, 1971, Ser. No. 199,739
Int. Cl. A23l 1/20
U.S. Cl. 426—441                   12 Claims

ABSTRACT OF THE DISCLOSURE

A process for producing nut meat substitutes from edible leguminous seeds comprising the steps of soaking in an aqueous medium, freeze drying, and roasting said seeds; additionally, when it is desired to obtain a nut meat substitute having a particular form such as the physical dimensions of various expensive nut meats, the steps of comminuting and forming are interposed between the soaking step and the freeze drying step.

BACKGROUND OF THE INVENTION

This invention relates to a process for treating edible leguminous seeds to produce synthetic nut meats.

The prior art shows numerous attempts to create synthetic nut meats from leguminous seeds: U.S. Pat. 1,774,110 (Aug. 26, 1930) to Harry W. Sloat; U.S. Pat. 2,083,853 (June 15, 1937) to Alfred H. McComb; U.S. Pat. 2,135,592 (Nov. 8, 1938) to Rollin H. Moulton; U.S. Pats. 3,594,184; 3,594,185 and 3,594,186 (July 20, 1971) all to Robert L. Hawley. All of these prior art teachings involve substantially the same basic process: leguminous seeds, principally soybeans, are subjected to the steps of soaking in an aqueous medium followed by roasting. The soaking step is allow the seeds to swell to a certain enlarged state by absorption of water, and the roasting step is to drive out excess water and ultimately yield a product which is alleged to resemble nut meats. The teachings of U.S. Pat. 2,083,853 differ from the basic prior art process above-described in that water adsorption is restricted such that following roasting the seed has undergone no net change in density. Leguminous seeds treated according to the above-described basic prior art process yield products of varying characteristics. Typically the end product is either soggy and unpalatable or burnt with a hard fragile texture. In general, these techniques are incapable of providing a product which possesses the fine, turgidly crisp texture characteristic of true nut meats. But the most severe limitation of these basic prior art processes is the unpredictability in quality of the ultimate product. Consequently, it is not surprising that synthetic nut meats derived from leguminous seeds have not enjoyed commerical success; for, particularly at the consumer level, synthetic nut meats have heretofore never presented a real alternative to the consumer in satiation of his desire for nut meats.

Unexpectedly, it has been found that certain legumes can be converted to nut-like products of excellent taste and texture in accordance with the present process. It is therefore an object of the present invention to produce a product comparable in taste and texture to expensive nut meats from comparatively inexpensive leguminous seeds such as lima beans, Great Northern white beans, and soybeans. A second object of the present invention is to produce a product which is not only comparable in taste and texture to expensive leguminous seeds but also to produce by forming means a product which is a configurational facsimile of any particular expensive nut meat.

Specifically, it has been discovered that Great Northern white beans can be transformed into a product which by common standards of gustation is indistinguishable from the peanut. Similarly, by this process, lima beans or soybeans can be made to mimic the taste and texture of slivered almonds. Additionally, it has been discovered that by the introduction of certain flavoring agents the nut meat substitutes produced in accordance with this invention can be made to acquire the characteristic flavor of any nut meat desired, or to acquire any flavor howsoever arbitrary. And, as mentioned above, it has been discovered that the product produced in accordance with this invention can be configurationally formed into a wide variety of shapes: from the simple shape of the cashew nut to the convoluted shapes of the pecan and walnut, or any shape however fanciful and arbitrary. Ideally, the configurational form and the predominant flavor of the product produced in accordance with this invention are made to correspond.

The meritorious advantages principally afforded by this invention are two-fold: First the edible leguminous seeds employed in this invention are significantly less expensive than the corresponding nut meats they so faithfully mimic. For example, the above mentioned lima beans and Great Northern white beans are approximately 50% cheaper than peanuts and vastly cheaper than the more expensive nut meats; and of course, the cost differential is even more pronounced on comparison with soybeans. The second advantage is that certain edible legumes, such as lima beans and Great Northern white beans, employed in the process herein described and claimed are very low in fat content (less than 2%); whereas the fat content of raw peanuts is approximately 40% and approximately 55% for almonds. This last named advantage is of considerable importance to the calorie-conscious, indeed to all persons conscious of the proper diet, since the principal use of the high-protein, low-calorie product obtained by the process herein disclosed will be as snack foods—both alone and incorporated into confections.

SUMMARY OF THE INVENTION

The invention is a process in which the leguminous seeds are soaked in an aqueous medium to achieve a swollen state, freeze dried to fixedly preserve this swollen state and to reduce the moisture content to a precisely defined and critical value, and finally roasted to achieve the desired nut meat texture and taste. It is the critical integration of this freeze drying step which solves the aforementioned problems that have beset prior attempts to produce synthetic nut meats from legumes. Also, in accordance with the process of the present invention, it is possible to extend the practice of the invention to certain legumes which heretofore had either not been considered or which had been considered but were found not amenable to the overall transformation in yielding nut meat substitutes.

DETAILED DESCRIPTION OF THE INVENTION

The process of this invention is achieved by subjecting edible leguminous seeds such as Great Northern white beans, lima beans, soybeans, green peas, black eyed peas, pinto beans, red beans, kidney beans, cowpeas and garbanzo peas to a multistep process. While it is evident that the process enjoys full applicability to practically all edible legumes, Great Northern white beans, lima beans and soybeans are preferred.

In the first step of the present process, the seeds are rinsed and allowed to soak in an aqueous medium until the seeds are substantially swollen by absorption of water. Preferably, a soaking period sufficient to achieve a degree of water absorption of at least 30% to about 120% by weight is employed. Normally the soaking period requires from 8 to 24 hours, but the soaking period can be substantially decreased if the soaking medium is heated since the rate of absorption is inversely related to temperature. Quantitatively, the optimum water absorption may be expressed as a weight percent. For example, before soaking the dried Great Northern white and lima beans contain approximately 3.2 weight percent water; whereas after a soaking period of 16 hours at room temperature the values are 46% and 62%, respectively. Another objective that is achieved by the soaking step is the leaching of undesirable constituents from the seeds that cause objectionable or bitter tastes. This is particularly true of the soybean; even though it has been found that the water extraction process occurring during the water absorption or soaking step is entirely adequate to render the soybeans entirely palatable and in proper condition for subsequent process steps of this invention. However, it is understood that the soybeans, for example, may be subjected to additional procedures if a blander taste is desired, or additional procedures may be resorted to if it is desired to remove a substantial quantity of the oil naturally present in the soybean. For example, when it is desired to insure a bland taste in the soybean, it has been found that leaching of objectionable constituents is markedly enhanced if the aqueous soaking medium is freshly renewed at intervals during the soaking step. Also, it has been found that the addition of soaps or organic synthetic water-soluble detergent compounds to the aqueous soaking medium markedly hasten the extraction of objectionable constituents from the soybeans. When it is desired to remove a substantial amount of the oil naturally present in the soybean without physical disruption of the bean (which would be the case if mechanical pressing were employed), it has been found that extraction with organic solvents is quite effective.

After the soaking step the seeds are rinsed repeatedly and allowed to drain before entering the second step of the process, the freeze drying step. The seeds are frozen and the occluded ice is sublimed at a pressure of from 0.01 mm. to 100.0 mm. of mercury. In order to achieve uniform results the seeds are either spread one layer deep in trays within the freeze drying chamber or are placed in rotating wire baskets so that each seed is uniformly dried. The freeze drying is continued until substantially all of the ice trapped within the cellular spaces of the seeds has been sublimed. This requires approximately 8 to 16 hours; and, after that period, the weight percent water is typically 1.8% for the lima bean, 1.5% for the Great Northern white bean, and 1.7% for the soybean, for example. In any case, freeze drying must be sufficient to yield a seed water content less than about 3% by weight.

The effect of the freeze drying is to permanently fix the seeds in the swollen state. Electron microscopy has shown the seeds after soaking and freeze drying to be characterized by expanded intercellular spaces meandering throughout the matrix of the seed. The overall effect is to impart a texture (and taste, after the final step of roasting) surprisingly comparable to true nut meats. No totally satisfactory reason can be offered as to why the freeze drying step is so uniquely critical to the transformation in yielding nut meat substitutes from the leguminous seeds, but some appreciation of the freeze drying effect is evident when the present invention is compared with the processes of the prior art. The art-disclosed processes roast the leguminous seeds immediately after soaking, and it is believed that the seeds so swollen and thoroughly laden with excess water undergo strong hydrolytic influences on contact with the hot oil or upon subjection to the high temperatures of dry roasting as a consequence of this large quantity of absorbed water being converted to steam. The net result, therefore, is comparable to a two step process in which the seeds are first boiled then roasted. Consequently, when the freeze drying step is omitted and the beans are immediately roasted following soaking, it is not surprising that the product has a flaccid, boiled texture or, at the other extreme, a hard, fragile, burnt-like texture characteristic of cereal or chicory. However, in accordance with the present invention, when the seeds are first freeze dried to a critical moisture content, the seeds do not experience any undue hydrolytic influences which damages taste and texture, but react under the heat of the roasting to yield products which in taste and texture compare with true nut meats. Also, freeze drying is uniquely important as the only effective means to dry the seeds in preparation for roasting. For example, if the seeds are air dried, the expanded structure is not preserved; but rather the seeds shrivel and become distorted and hard; and upon roasting become thoroughly hard and unpalatable.

On completion of the freeze drying step the seeds are subjected to the final major process step of roasting. The roasting step can be in continuous integration with the freeze drying in the sense that roasting follows immediately or removal of the seeds from the freeze drying chamber, or the roating step can be conducted in a batch process fashion since the seeds after freeze drying may be stored at room temperature for an indefinite time period without detriment. Either of two basic roasting techniques are employed: dry roasting or deep oil roasting.

In the dry roasting technique the seeds are placed in a rotating wire cage in an oven maintained at a temperature ranging from 180 to 210° C. for 6 to 20 minutes or until the seeds have acquired a uniform brownish tone. In actual practice the precise time of roasting at a chosen temperature within the above-given range varies with the total quantity of seeds being roasted. On completion of the roasting step the seeds are placed on wire screens and allowed to cool.

The deep oil roasting may be carried out by conventional means and any edible animal or vegetable oil may be employed. In preferred practice the seeds are confined in wire baskets and submerged in the hot oil for a time period sufficient to impart a uniform golden color and desired crispness. Generally, the seeds are immersed in oil at a temperature of from 140° C. to about 210° C. for from 1 to about 3 minutes. For example, the deep oil roasting requires about 2 minutes at 190° C. to 205° C. for the Great Northern white beans and 140° C. to 150° C. for the lima beans and 200° C. to 205° C. for the soybeans. After the prescribed roasting period the nut meat substitute products are drained and allowed to cool on open screen racks. At this point the nut meat substitutes may either be salted and packaged, or additionally treated to impart desired flavor and color. For example, the finished product may be sprayed with flavoring agents, individually coated with candy-like shells or chocolate, or incorporated into large confections. Alternately, the flavoring may be introduced by addition to the soaking medium or by addition to the roasting oil.

An additional embodiment of the invention is to produce a nut meat substitute which is a configurational facsimile of any chosen expensive nut meat or to produce a nut meat substitute having any desired configurational form. This configurational forming is achieved by interposing between the soaking step and the freeze drying step, the steps of comminuting the seeds and form pressing the comminuted seeds to obtain the desired configurational form. Thereafter, the shaped product is subjected to the freeze drying step and the final roasting step. Flavoring and coloring agents may be added to the comminuted seed mass prior to press forming. Certain binding agents such as albumins, starch and edible gums can be added. And, in order to impart a crisp, homogeneous texture to the ultimate product, certain moisturizing and plasticizing agents such as glycerine and sorbitol can be added to the comminuted mass prior to freeze drying.

Specific examples will most clearly demonstrate the preferred embodiments of the invention.

EXAMPLE I 100 grams of Great Northern white beans having a moisture content of 3.2% by weight were washed and soaked for 16 hours at room temperature in a copious excess of distilled water. After rinsing and draining, the water content of the soaked beans was found to be 54.9%. The soaked beans were then frozen and dried at a pressure of 1.0 mm. mercury for 10 hours at which time the water content had a value of 1.5% by weight. The freeze dried beans were then deep roasted in soybean oil for two minutes at 200° C. The nut meat substitute so produced had a shiny golden tone and possessed a taste and texture comparable to the peanut.

Where in Example I the Great Northern white beans are deep roasted in soybean oil for 3 minutes at 185° C. a substantially equivalent product is obtained.

Where in Example I the Great Northern white beans are soaked for 6 hours in a water bath maintained at 43° C., a substantially equivalent product is obtained.

Where in Example I the Great Northern white beans are freeze dried at 5 mm. mercury for 10 hours, a substantially equivalent product is obtained.

EXAMPLE II 100 grams of lima beans having a moisture content of 3.2% by weight were washed and soaked for 16 hours at room temperature in a copious excess of distilled water. After rinsing and draining, the water content of the soaked beans was found to be 62.4%. The soaked beans were then frozen and dried at a pressure of 1.0 mm. mercury for 10 hours at which time the water content had a value of 1.8% by weight. The freeze dried beans were then deep roasted in soybean oil for two minutes at 142° C. The nut meat substitute so produced had a shiny golden tone and possessed a taste and texture comparable to slivered almonds.

Where in Example II the lima beans are deep oil roasted in soybean oil for 1.75 minutes at 160° C., an equivalent product is obtained.

Where in Example II the lima beans are soaked for 3 hours in a water bath maintained at 50° C., a substantially equivalent product is obtained.

Where in Example II the lima beans are freeze dried at 0.1 mm. mercury for 8 hours, a substantially equivalent product is obtained.

Where in Example II the lime beans are dry roasted at 200° C. for 6 minutes, a substantially equivalent product is obtained.

EXAMPLE III 100 grams of soybeans having a moisture content of 2.8% by weight are washed and soaked for 12 hours at room temperature in a copious excess of distilled water. After rinsing and draining, the soaked beans possess a water content of 70% by weight. The soaked beans are then frozen and dried at a pressure of 1.0 mm. mercury for 10 hours at which time the water content has a value of 1.7% by weight. The freeze dried beans are then deep roased in soybean oil for two minutes at 200° C. The nut meat substitute so produced has a shiny golden tone and possesses a taste and texture comparable to slivered almonds.

Where in Example III the soybeans are replaced by Great Northern white beans, lima beans, green peas, black eyed peas, pinto beans, red beans, kidney beans, cowpeas and garbanzo peas, a substantially equivalent nut meat substitute is obtained.

Where in Example III the soybeans are dry roasted at 190° C. for 15 minutes, an equivalent product is obtained.

EXAMPLE IV 100 grams of Great Northern white beans having a moisture content of 3.2% by weight are washed and soaked for 12 hours at room temperature in a copious excess of distilled water. The soaked beans are then tumbled through fine, high pressure water jets in order to remove any adhering skins. The soaked beans are then roughly comminuted so that the average particle size is about 1 mm.³. The comminuted bean mass is then configurationally shaped by press molding at a pressure sufficient to cause adhesion. The shaped products are then frozen and dried at 1.0 mm. of mercury for 10 hours to achieve a moisture content of 1.5% by weight. The shaped, dried beans are then roasted in soybean oil for two minutes at 200° C.

Where in Example IV the Great Northern white beans are replaced by lima beans, soybeans, green peas, black eyed peas, pinto beans, red beans, kidney beans, cowpeas and garbanzo peas, or mixtures thereof, a comparable shaped nut meat substitute is obtained.

Where in Example IV binding agents such as edible gums, albumins and starch are added to the comminuted bean mass prior to shaping, a comparable shaped nut meat substitute with enhanced structural integrity is obtained.

Where in Example IV plasticizing and moisturizing agents, such as sorbitol and glycerine to the comminuted bean mass prior to shaping a comparable shaped nut meat substitute with improved texture is obtained.

Of course it is understood that the above examples are only for purposes of illustrating the invention and in no way constitute a complete statement of the invention. It is equally understood that the invention is not limited to the specific list of edible legumes above-mentioned, but is fully applicable to any leguminous species commonly used for food purposes; the selection of any particular legume simply being a matter of choice possibly directed by cost, supply, and the particular cellular disposition of the legume in question. The last mentioned value is ultimately reflective of the texture of the finished product. Also, it is understood that the soaking medum while principally an aqueous solution, may contain certain salts such as water-soluble calcium salts or other additives such as glycerine to benefit the sorption process. Also, it is understood that the synthetic nut meat products produced by this process can be coated with edible, water impervious materials, such as high temperature melting waxes and fat acids, so that the nut meat product will maintain a crisp texture within the wet matrix of baking batters.

What is claimed is:

1. A process for preparing nut meat substitutes comprising the steps of:
    (a) soaking a leguminous seed selected from the group consisting of beans and peas in an aqueous medium until said seeds have absorbed at least 30 weight percent water;
    (b) freeze drying the soaked seeds of step (a) at reduced pressure until the moisture content of the seeds is less than about 3 weight percent; and
    (c) roasting the freeze dried seeds of step (b).

2. The process of claim 1 wherein the roasting step comprises a deep oil roasting conducted at a temperature ranging from 140° C. to 205° C. and for a time period ranging from 1 minute to 3 minutes.

3. The process of claim 1 wherein the roasting step comprises a dry roasting conducted at a temperature ranging from 180° C. to 210° C. for a time period ranging from 6 minutes to 20 minutes.

4. The process of claim 1 wherein the leguminous seed is the soybean.

5. The process of claim 1 wherein the leguminous seed is the lima bean.

6. The process of claim 1 wherein the leguminous seed is the Great Northern white bean.

7. A process for preparing nut meat substitutes comprising the steps of:
    (a) soaking a leguminous seed selected from the group consisting of beans and peas in an aqueous medium until said seeds have absorbed at least 30 weight percent water;

(b) comminuting the soaked seeds;
(c) press shaping the comminuted seeds;
(d) freeze drying the shaped seeds at a reduced pressure until the moisture content of the shaped seeds is less than about 3 weight percent; and
(e) roasting the freeze dried shaped seeds.

8. The process of claim 7 wherein the roasting step comprises a deep oil roasting conducted at a temperature ranging from 140° C. to 205° C. and for a time period ranging from 1 minute to 3 minutes.

9. The process of claim 7 wherein the roasting step comprises a dry roasting conducted at a temperature ranging from 180° C. to 210° C. for a time period ranging from 6 minutes to 20 minutes.

10. The process of claim 7 wherein the leguminous seed is the soybean.

11. The process of claim 7 wherein the leguminous seed is the lima bean.

12. The process of claim 7 wherein the leguminous seed is the Great Northern white bean.

References Cited

UNITED STATES PATENTS

| | | | |
|---|---|---|---|
| 3,294,549 | 12/1966 | Vix et al. | 99—98 |
| 3,203,808 | 8/1965 | Thompson et al. | 99—204 |
| 3,594,184 | 7/1971 | Hawley et al. | 99—98 |
| 3,188,750 | 6/1965 | Davis et al. | 99—204 |
| 3,291,615 | 12/1966 | Thompson et al. | 99—98 |
| 1,774,110 | 8/1930 | Sloal | 99—98 |
| 2,083,853 | 6/1937 | McComb | 99—98 |
| 3,598,610 | 8/1971 | Hawley et al. | 99—98 |

NORMAN YUDKOFF, Primary Examiner
C. P. RIBANDO, Assistant Examiner

U.S. Cl. X.R.
426—460, 389, 444